(12) United States Patent
Lu et al.

(10) Patent No.: US 9,525,783 B2
(45) Date of Patent: Dec. 20, 2016

(54) COMMUNICATION CONTROLLING METHOD, SYSTEM AND ELECTRONIC DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/713,449

(22) Filed: May 15, 2015

(65) Prior Publication Data

US 2016/0065749 A1   Mar. 3, 2016

(30) Foreign Application Priority Data

Aug. 29, 2014 (CN) .......................... 2014 1 0434319

(51) Int. Cl.
*G06F 15/16* (2006.01)
*H04M 15/00* (2006.01)
*H04W 76/06* (2009.01)
*G06F 15/173* (2006.01)
*H04M 11/00* (2006.01)

(52) U.S. Cl.
CPC ......... *H04M 15/885* (2013.01); *H04W 76/068* (2013.01)

(58) Field of Classification Search
CPC ...... G06F 15/173; H04M 11/00; H04M 15/00; H04L 67/14; H04L 67/141
USPC ...................................................... 709/224
See application file for complete search history.

(56) References Cited

U.S. PATENT DOCUMENTS

| | | | |
|---|---|---|---|
| 6,785,724 B1 * | 8/2004 | Drainville | H04L 29/06 370/260 |
| 2012/0164971 A1 * | 6/2012 | Choi | H04M 1/72566 455/405 |

\* cited by examiner

*Primary Examiner* — Huy C Ho
(74) *Attorney, Agent, or Firm* — Zhigang Ma

(57) ABSTRACT

A method for controlling wireless internet connection of an electronic device is provided. The electronic device tracks the habits of a user of starting or ending the application and adjusts itself to match the habits, the application is based on the Internet. The electronic device automatically disconnects a communication link between the electronic device and the network of mobile Internet when the current time is an idle usage time of the application.

7 Claims, 3 Drawing Sheets

| Number | Time Period | Application Name |
|---|---|---|
| 1 | [08: 00AM,08: 15AM] | Browser |
| 2 | [08: 50AM,09: 15AM] | Microblog |
| 3 | [07: 58AM,08: 17AM] | Browser |
| 4 | [07: 50AM,08: 30AM] | Microblog |
| 5 | [12: 30AM,13: 30PM] | Video Player |
| 6 | [07: 45AM,08: 15AM] | Browser |
| 7 | [08: 01AM,08: 09AM] | Browser |
| ... | ... | ... |

FIG. 2

COMMUNICATION CONTROLLING METHOD, SYSTEM AND ELECTRONIC DEVICE USING THE SAME

FIELD

The subject matter relates to communication technologies, specifically to a system and a method for controlling wireless internet connection of an electronic device.

BACKGROUND

In recent years, various data communication methods, such as the $3^{rd}$ Generation (3G) or $4^{th}$ Generation (4G) mobile telecommunication network method, fixed wireless communication standards, such as Worldwide Interoperability for Microwave Access (WiMax™), and Wireless Local Area Network (WLAN) standards, such as Wireless Fidelity (WiFi™) et al, have been proposed. Some of these data communication methods are free, and others require a user to pay for the service. Consequently, a communication controlling method for switching networks easily between data communication methods is needed.

BRIEF DESCRIPTION OF THE DRAWINGS

Implementations of the present technology will now be described, by way of example only, with reference to the attached figures.

FIG. 2 is a diagram showing a recording table according to an exemplary embodiment.

DETAILED DESCRIPTION

Figure 1:
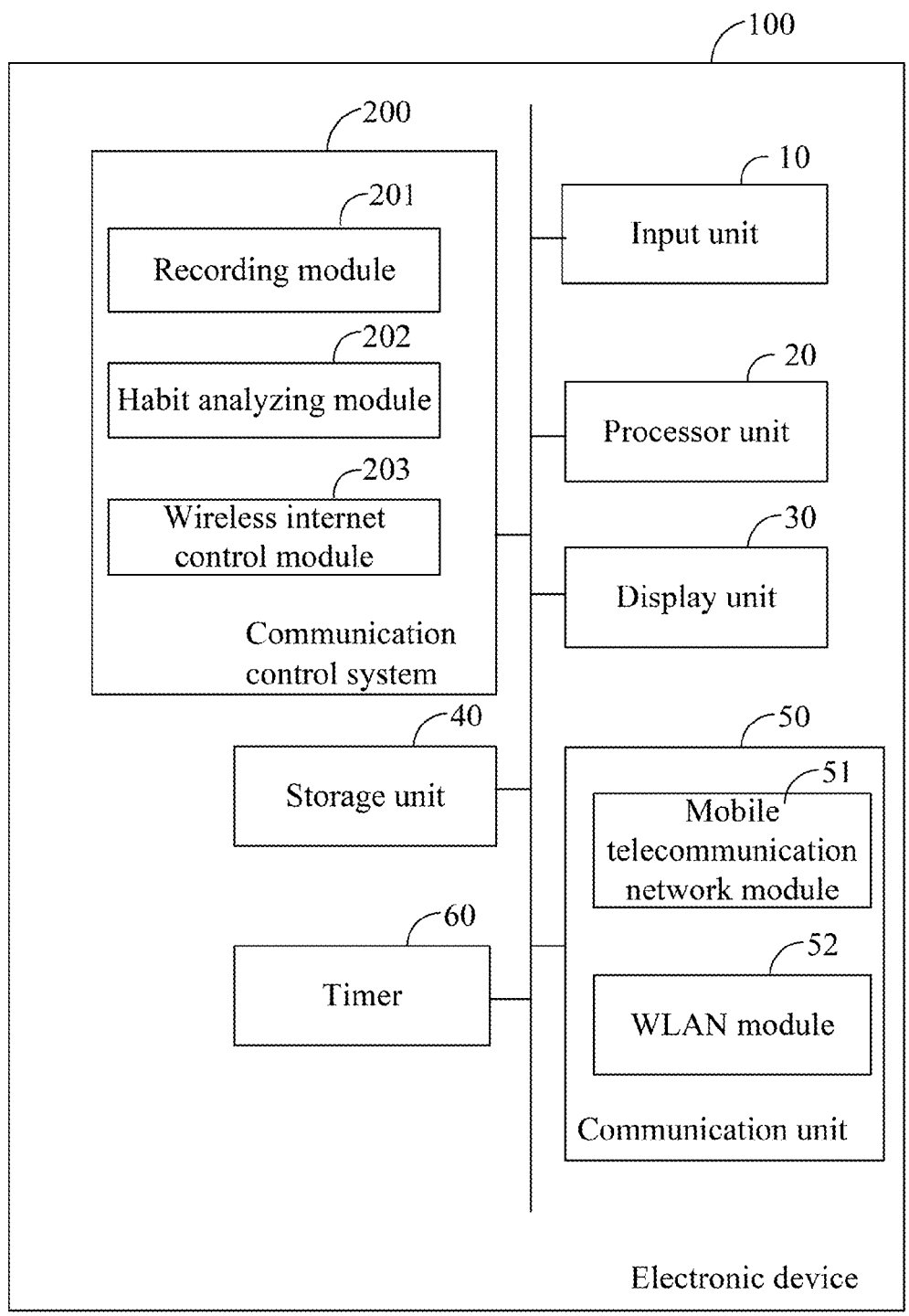
FIG. 1 is a block diagram of an electronic device according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "comprising" means "including, but not necessarily limited to"; it specifically indicates open-ended inclusion or membership in a so-described combination, group, series and the like.

FIG. 1 shows a block diagram of an electronic device 100 according to an exemplary embodiment. The electronic device 100 can be a cellular telephone, a smart phone, a personal digital assistant (PDA), a computer, a laptop, a tablet computer, or the like. The electronic device 100 includes an input unit 10, a processor unit 20, a display unit 30, a storage unit 40, a communication unit 50 and a timer 60.

The communication unit 50 includes a mobile telecommunication network module 51 and a WLAN module 52. The mobile telecommunication network module 51 is configured to connect the electronic device 100 to the Internet via a mobile internet network, such as the General Packet Radio Service (GPRS) network, the Code Division Multiple Access (CDMA) network, the 3G Telecommunication network, the 4G Telecommunication network, or the like. The WLAN module 52 is configured to connect the electronic device 100 to the Internet via a fixed wireless communication network, such as WiMax™ network, or a WLAN network, such as WiFi™ network, or Wireless LAN Authentication and Privacy Infrastructure (WAPI™) network.

The storage unit 40 is a non-transitory computer-readable medium configured to store one or more applications. In an embodiment, the applications include a first application based on Internet, such as an Internet web page browser, social software, or the like. Namely, the first application is running on a remote device connected to the electronic device 100. The applications also include a second application which does not need networking support.

A communication control system 200 is run by the processor unit 20 for enabling the electronic device 100 to open or close the connection between the electronic device 100 and the Mobile Internet. The communication control system 200 is stored in the storage unit 40, and includes a plurality of instructions, which can be executed by the processor unit 20. The communication control system 200 includes a recording module 201, a habit analyzing module 202 and a wireless internet control module 203.

The input unit 10 is configured to generate different input signals in response to selections of a user, and transmit the input signals to the processor unit 20 and the recording module 201. The input unit 10 can be a button, a keyboard, a touch panel, or the like. In an embodiment, user can open or exit an application by using the input unit 10.

The processor unit 20 receives the input signals transmitted from the input unit 10 and executes the tasks or command function components of the electronic device 100 to execute the tasks corresponding to the received input signals.

The recording module 201 is configured to record a time period between a start and an end of the first application, and store the time period as a record in the storage unit 40.

In details, when one of the first applications is started by the user, the input unit 10 receives a start operation from the user and generates a start signal; the input unit 10 further transmits the start signal to the processor unit 20 and the recording module 201. The recording module 201 obtains a current start time from the timer 60 in response of the start signal. Namely, when the first application is stopped by the user, the input unit 10 generates an end signal according to an end operation input by the user, and the input unit 10 further transmits the end signal to the processor unit 20 and the recording module 201. The recording module 201 obtains a current end time from the timer 60 in response of the end signal. The recording module 201 further determines the time period between the current start time and the current end time, and records the time period as a record in the storage unit 40. In an embodiment, the end operation includes an operation that stops the first application, or an operation that exits the user interface of the first application but still runs the first application in the background.

In an embodiment, the recording module 201 further records the name of the first application in the record.

For example, when the user starts an application "browser" at "8:00 AM", the recording module 201 obtains the current start time "8:00 AM" from the timer 60. When the user stops the "browser" application at "8:15 AM", the recording module 201 obtains the current end time "8:15 AM" from the timer 60. The recording module 201 records the time period [8:00 AM, 8:15 AM] between the start and the end of the application "browser", and stores the time period as a record in the storage unit 40.

The habit analyzing module 202 is configured to analyze whether a current time is a peak usage time or an idle usage time of the first application, according to times of the current time value which appears in the records recorded by the recording module 201 within a predetermined time cycle. If the current time value repeatedly appears a predetermined number of times in the records recorded within the predetermined time cycle, this current time is the peak usage time. Whereas, the number of times of the current time value appearing in the records recorded within the predetermined time cycle is less than the predetermined number of times, this current time is the idle usage time.

For example, FIG. 2 illustrates a record table which includes a number of records recorded by the recording module 201 within one predetermined time cycle, wherein one predetermined time cycle is defined as 7 days, and the predetermined number of times is 3. In one predetermined time cycle, if the current time is "09:00 AM", the habit analyzing module 202 determines the times that the current time appears in the records recorded within 7 days (1 time, appears in the second record) is less than the predetermined number of times, and the current time is an idle usage time. If the current time is "08:05 AM", the times that the current time appears in the records recorded within 7 days (5 times, appears in the 1, 3, 4, 6 and 7 records) is more than the predetermined number of times, the habit analyzing module 202 determines the current time is a peak usage time.

The wireless internet control module 203 is configured to control the mobile telecommunication network module 51 to disconnect a communication link between the electronic device 100 and the network of mobile internet, when the habit analyzing module 202 determines the current time is an idle usage time. In detail, when the habit analyzing module 202 determines the current time is an idle usage time, the habit analyzing module 202 sends an off signal to the wireless internet control module 203, and the wireless internet control module 203 controls the mobile telecommunication network module 51 to disconnect a communication link between the electronic device 100 and the network of mobile internet according to the off signal.

Figure 3:
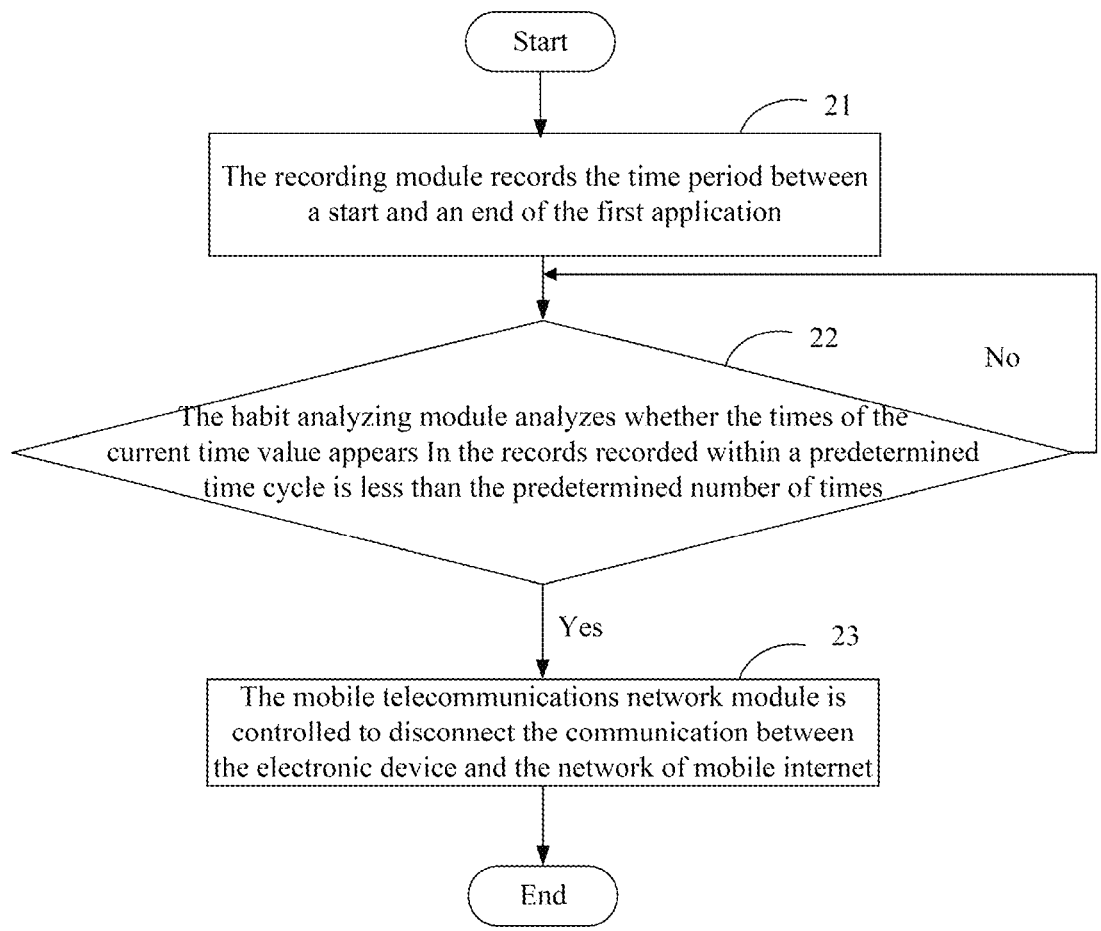
FIG. 3 is a flow chart of a method for controlling an internet connection of an electronic device, according to an exemplary embodiment.

Referring to FIG. 3, a flowchart of a method for controlling an internet connection of the electronic device 100 is presented in accordance with an example embodiment. The method is provided by way of example, as there are a variety of ways to carry out the method. The method described below can be carried out using the configurations illustrated in FIGS. 1 and 2, for example, and various elements of these figures are referenced in explaining example method. Each block shown in FIG. 3 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 21.

At block 21, the recording module 201 records the time period between a start and an end of the first application. In detail, the recording module 201 obtains a current starting time from the timer 60 when the first application is started by the user, and obtains a current ending time from the timer 60 when the first application is ended by the user, the recording module 201 further determines the time period between the current starting time and the current ending time, and records the time period as a record in the storage unit 40. In an embodiment, the recording module 201 further records the name of the first application in the record.

At block 22, the habit analyzing module 202 analyzes whether the times of the current time value appearing in the records recorded within a predetermined time cycle is less than the predetermined number of times, if yes, the process goes to block 23; otherwise, the process continues block 22. The habit analyzing module 202 analyzes whether a current time is a peak usage time or an idle usage time of the first application, according to the times of the current time value appearing in the records recorded by the recording module 201 within a predetermined time cycle. If the current time value repeatedly appears a predetermined number of times in the records within the predetermined time cycle, this current time is the peak usage time. Whereas, the number of times of the current time value appearing in the records within the predetermined time cycle is less than the predetermined number of times, this current time is the idle usage time.

At block 23, the mobile telecommunication network module 51 is controlled to disconnect a communication link between the electronic device 100 and the network of mobile internet. When the habit analyzing module 202 determines the current time is an idle usage time, the habit analyzing module 202 sends an off signal to the wireless internet control module 203, the wireless internet control module 203 controls the mobile telecommunication network module 51 to disconnect a communication link between the electronic device 100 and the network of mobile internet according to the off signal.

With such configuration, the electronic device 100 tracks the habits of a user starting or ending the first application and adjusts itself to match the habits of the user, the electronic device 100 automatically disconnects a communication link between the electronic device 100 and the network of mobile internet when the current time is an idle usage time of the first application, which reduces unexpected fee of mobile internet service.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for controlling wireless internet connection of an electronic device, the method comprising:
   recording a time period between a start and an end of an application as a record, wherein the application is running on a remote device connected to the electronic device;
   determining times of a current time value which appears in the record recorded within a predetermined time cycle, and analyzing whether the determined times is less than a predetermined number of times; and disconnecting a communication link between the electronic device and network of mobile internet, when the times of a current time value which appears in the record recorded within a predetermined time cycle is less than a predetermined number of times.

2. The method as described in claim 1, further comprising recording a name of the application in the record.

3. The method as described in claim 1, further comprising
obtaining a current start time from a timer when the application is started by a user;
obtaining a current end time from the timer when the application is stopped by the user; and
determining the time period between the current start time and the current end time, and recording the time period as a record.

4. An electronic device comprising:
a processor; and
a storage unit storing a plurality of instructions, which when executed by the processor, causes the processor to:
record a time period between a start and an end of an application as a record, wherein the application is running on a remote device connected to the electronic device;
determine times of a current time value which appears in the record recorded within a predetermined time cycle, and analyze whether the determined times is less than a predetermined number of times; and
disconnect a communication link between the electronic device and network of mobile internet, when the times of a current time value which appears in the record recorded within a predetermined time cycle is less than a predetermined number of times.

5. The electronic device as described in claim 4, wherein the processor further records a name of the application in the record.

6. The electronic device as described in claim 4, wherein the processor further
obtains a current start time from a timer when the application is started by a user;
obtains a current end time from the timer when the application is stopped by the user; and
determines the time period between the current start time and the current end time, and records the time period as a record.

7. The electronic device as described in claim 4, further comprising an input unit configured to receive a start operation from the user and generate a start signal and transmit the start signal to the processor, and receive an end operation from the user and generate an end signal and transmit the end signal to the processor.

* * * * *